United States Patent [19]
Ono et al.

[11] 3,894,155
[45] July 8, 1975

[54] PROCESS FOR THE PREPARATION OF A FROZEN DOUGH FOR BAKERY PRODUCTS

[75] Inventors: Shoji Ono, Ohi-Machi; Ikuo Kitamura, Kawagoe; Tomoko Kuramoto, Tokyo; Keizaburo Taguchi, Fukuoka; Tomozo Yoshizaki, Tokyo, all of Japan

[73] Assignee: Nisshin Flour Milling Co., Ltd., Tokyo, Japan

[22] Filed: Oct. 23, 1973

[21] Appl. No.: 409,000

[30] Foreign Application Priority Data
Dec. 8, 1972  Japan.............................. 47-122439

[52] U.S. Cl. ...................... 426/25; 426/19; 426/24; 426/26; 426/27
[51] Int. Cl........ A21d 8/04; A21d 2/04; A21d 2/22
[58] Field of Search .............. 426/24, 25, 26, 27, 19

[56] References Cited
UNITED STATES PATENTS
2,333,764   11/1943   Burgeson .............................. 426/19

*Primary Examiner*—James R. Hoffman
*Attorney, Agent, or Firm*—James C. Haight

[57] ABSTRACT

A frozen dough for bakery products whose storage stability has been considerably improved may be prepared by cooling prefermented dough containing a small amount of yeast to a temperature of 2° to 15°C and immediately further incorporating thereinto additional yeast.

The frozen dough so obtained can produce bread of appearance, texture and eating quality which are not appreciably degraded.

8 Claims, No Drawings

PROCESS FOR THE PREPARATION OF A FROZEN DOUGH FOR BAKERY PRODUCTS

BACKGROUND OF THE INVENTION

The present invention relates to a process of freezing a dough to make it suitable for producing bakery products.

Freezing baking doughs for distribution has been increasingly demanded for the sake of breadmaking factory efficiencies such as intensive mass-production, concentration of factories and facilities, reduction in personnel, cost-savings, expansion of sales and delivery territory, etc. and in connection with the development of bake-off bakeries since breadmaking with frozen dough was first introduced around 1950 in America.

Most of frozen doughs which are employed in America, however, are those which are rich in sugar, oil and fat, such as Danish Pastry. Frozen doughs of lean formula which are poorer in sugar, oil and fat are infrequently produced, as they are storable for only a very short period of time.

A lean formula frozen dough such as bread is considerably susceptible to degradation in contrast with rich formula dough such as Danish Pastry. Thus, the refrigeration storage of lean formula frozen dough gives rise to considerable extension of the proofing time during which an expansion of the thawed dough to a given volume is achieved, a reduction in the volume of the baked bread and a deterioration in the quality thereof (coarse skin and crum etc.), so that the bread has a quality which is not acceptable for a commercial product.

The principal causes of poor storage stability, part of which has been indicated or supposed by other examiners, have been found to be due to the following three points:

— reduction in yeast activity;
— leakage of reducing substances from dead yeast cells; and
— relaxation of baked dough.

SUMMARY OF THE INVENTION

As a result of serious examination to avoid the principal causes of poor storage stability mentioned above, particularly for a lean formula dough low in sugar, oil and fat, we have now discovered a novel process for breadmaking with a frozen dough which is significantly improved in its storage stability.

According to the present invention, there is provided a process for the preparation of a frozen dough for bakery products which comprises the steps of mixing a dough into which yeast is initially incorporated, subjecting the dough to preliminary fermentation, then cooling the dough to a temperature of 2° to 15°C, immediately followed by incorporation of additional yeast, again mixing the dough thus formed and freezing it without further fermentation.

DESCRIPTION OF THE PREFERRED EMBODIMENTS

Hitherto, frozen doughs have been generally prepared according to the straight dough method or the sponge dough method.

The straight dough method comprises the following steps: Formulation → Mixing → Prefermentation → Punching → Division → Rounding → Benching → Moulding → Freezing → Storage in refrigeration → Thawing and Proofing → Baking. The sponge dough method comprises the following steps: Preliminary Formulation → Mixing → Prefermentation → Formulation → Mixing → Fermentation → Division → Rounding → Benching → Moulding → Freezing → Storage in refrigeration → Thawing and Proofing → Baking.

In the above straight or sponge dough methods, a frozen dough, particularly for bread, tends to be of reduced quality after thawing and baking. To eliminate this tendency, a slight excess of yeast is used in the mixing step and the prefermentation time is rendered as short as possible. With this proposed technique, however, it is during a maximum period of of only about 1 week that the quality of bread made of such frozen dough is not reduced to an unacceptable extent.

The process for the preparation of a frozen dough and bread therefrom according to the present invention may comprise the following steps: Formulation → Mixing → Prefermentation → Punching → Cooling → Incorporation of additional yeast, and Remixing → Division, Rounding, Benching → Moulding → Freezing → Storage in refrigeration → Thawing → Proofing → Baking.

The above process is characterized by the following:

1. It is generally believed that yeast present in a fermenting dough is liable to reduce its activity (fermentation ability) and further to decompose and thereby leak out reducing substances, resulting in degradation of the dough. Therefore, the amount of yeast which is initially incorporated in the dough to be used for prefermentation is reduced to 1% or less by weight of the flour used, preferably 0.1 –1% by weight, so as to decrease the influence of freezing on yeast which is in the activated state for fermentation. The amount of 1% or less of the initially added yeast has little effect on the baking characteristics of the dough even if the yeast initially added would become wholly deactivated during storage and thus generate reducing substances. The prefermentation time with 1% or less of yeast is suitably less than 3 hours but may vary depending upon the nature of flour and the sort of bread, so that the texture of bread will become most favorable.

2. The degree of fermentation by the action of yeast depends on the fermentation conditions, that is fermentation temperature and time. The lower the temperature and the shorter the time, the less the fermentation proceeds and hence the yeast becomes less susceptible to degradation by freezing. For this reason the dough is cooled to a temperature of 2° to 15°C before the incorporation of additional yeast and after the prefermentation. This cooling suppresses the fermentation activity of the additional yeast and the degradation of the latter by freezing is considerably inhibited. The cooling temperature has a significant effect on the storage stability of the frozen dough, as is observed from the following test results which have been obtained with a dough for use in preparing standard white bread containing 0.5% yeast initially added and 4.0% of additional yeast:

| Cooling temperature | Room temp. | 15°C | 10°C | 5°C |
|---|---|---|---|---|
| *Storage period with no degradation (weeks) | 4 | 8 | 12 | >16 |

*Evaluated from the quality of bread subjected to thawing, proofing and baking.

3. Additional yeast is incorporated into the cooled dough in an amount of 2 to 6% of the flour used in the dough. It is necessary for the additional yeast to be scarcely activated at the time of being mixed into the dough and to be frozen while the yeast remains in the stage of dormancy or induction. The additional yeast takes a principal part in proof fermentation which takes place after thawing of the frozen dough. After the incorporation of additional yeast, the dough is cooled to 2°–15°C and a short freezing time is employed so as to inhibit fermentation as far as possible. Usually the freezing time may be within 30 minutes. The additional yeast may be incorporated either as such, in form of a dispersion in a small amount of water, or as a mixture with an oil, fat or emulsifier.

4. Desirably, 5 to 50 ppm of potassium bromate or ascorbic acid or a mixture of these (5 to 50 ppm, respectively) may be added during mixing of the dough to inhibit the relaxation of the dough and to oxidize reducing substances leaked from yeast.

The frozen dough prepared according to the invention can be used to produce bakery products.

The invention is further illustrated, but in no way limited, by the following Examples in which all parts are by weight.

EXAMPLE 1

A dough formulation for white bread was prepared from the following ingredients:

| | |
|---|---|
| Flour | 100 parts |
| Sugar | 4 " |
| Common salt | 2 " |
| Shortening | 4 " |
| Compressed yeast | 0.5 " |
| | (plus 4.0 parts as additional yeast) |
| Water | 58 " |
| Potassium bromate | 20 ppm |
| Ascorbic acid | 30 " |

The formulation was mixed with a mixer in a conventional manner to form a dough. The dough was fermented at 30°C for 1 hour, then punched and immediately cooled to 10°C. To the cooled dough was further added 4 parts of compressed yeast (the additional yeast), followed by through mixing with cooling so as not to elevate the temperature of the dough. The dough was then divided into pieces 200 g weight each, which were benched for 20 minutes and moulded. The dough was then frozen in an air blast-freezer at −35°C. until the central portion of the dough reached a temperature of −20°C, and stored at this temperature.

For breadmaking, the frozen dough was introduced into a case, thawed in a proofer at a temperature of 30°C and a humidity of 90%, and baked in an usual manner after the dough had been expanded to a definite volume.

The test results are summarized below:

| | Period of storage at −20°C (weeks) | | | | |
|---|---|---|---|---|---|
| | 0 | 2 | 4 | 8 | 12 |
| Volume of bread in Example 1 (cc) | 830 | 940 | 920 | 890 | 870 |
| Volume of bread in control* (cc) | 960 | 930 | 840 | 780 | — |

*Bread conventionally prepared without cooling of the dough and incorporation of the additional yeast.

For the bread made by the present process, its volume did not decrease and its texture did not substantially change after as long as 12 weeks storage further, its proofing time was within 3.5 hours from the beginning of thawing. On the other hand, as for the bread made by the prior art method in which the yeast was initially added all at one time, its quality was slightly reduced after up to 2 weeks and in the 4th week the proofing time reached around 5 hours, the volume decreased and the quality was appreciably degraded.

EXAMPLE 2

A formulation for white bread was prepared from the following ingredients:

| | |
|---|---|
| Flour | 100 parts |
| Sugar | 4 " |
| Common salt | 2 " |
| Shortening | 2 " |
| | (plus 3 parts as additional shortening) |
| Compressed yeast | 0.5 " |
| | (plus 5.0 parts as additional yeast) |
| Water | 62 " |
| Potassium bromate | 15 ppm |
| Ascorbic acid | 30 ppm |

Following the procedure as described in Example 1, a dough was formed and cooled at 5°C. To the cooled dough was further added a uniform mixture of 5 parts of compressed yeast and 3 parts of shortening, followed by thorough mixing with a mixer in such a manner so as not to elevate the temperature of the dough. The resulting dough was frozen and stored as in Example 1. 16 weeks later the frozen dough was subjected to thawing, proofing and baking.

The bread thus obtained had a color as good as fresh bread, a fine grain texture and a volume of 860 cc. The proofing time, inclusive of thawing time was 210 minutes.

EXAMPLE 3

A formulation for butter rolls was prepared from the following ingredients:

| | |
|---|---|
| Flour | 100 parts |
| Compressed yeast | 0.5 " |
| | (plus 4 parts as additional yeast) |
| Egg | 5 " |
| Shortening | 10 " |
| Common salt | 2 " |
| Sugar | 10 " |
| Non-fat dried milk | 2 " |
| Water | 50 " |
| Potassium bromate | 35 ppm |

The formulation was mixed with a mixer in a conventional manner to form a dough. The dough was fermented at 28°C for 90 minutes, then punched and cooled to 8°C. To the cooled dough was further added 4 parts of compressed yeast with mixing. Subsequently, the dough was divided, rounded, benched and moulded. It was rapidly frozen to a temperature of −20°C in an air blast-freezer and then stored at this temperature. After the storage for 8 weeks, the dough was subjected to thawing and proofing in a proofer at a temperature of 30°C and a humidity of 80%, followed by baking at 230°C, whereby the dough was expanded to a definite volume.

The butter roll thus produced had no appreciable degradation with respect to its appearance, texture and eating quality.

EXAMPLE 4

A formulation for croissants was prepared from the following ingredients:

| | |
|---|---|
| Flour | 100 parts |
| Compressed yeast | 0.5 " |
| | (plus 4 parts as additional yeast) |
| Shortening | 5 " |
| Common salt | 2 " |
| Sugar | 5 " |
| Non-fat dried milk | 2 " |
| Water | 60 " |
| Roll-in butter | 50 " |
| Potassium bromate | 20 ppm |
| Ascorbic acid | 30 " |

The formulation was mixed with a mixer in a conventional manner to form a dough. The dough was fermented at 28°C for 2 hours, then punched and cooled as in Example 1. To the cooled dough was further added 4 parts of compressed yeast by means of a mixer while cooling. After mixing, the dough was rolled to a certain thickness and coated with roll-in butter to give a sandwich of dough and butter in the usual manner. The resulting dough was divided, moulded and rapidly frozen to a temperature of −20°C in a refrigerator. The frozen dough was stored at this temperature. 8 weeks later, the dough was subjected to thawing and proofing in a proofer at a temperature of 30°C and a humidity of 80%, followed by baking at 230°C.

The croissant thus produced had no appreciable degradation with respect to its appearance, texture and eating quality.

What we claim is:

1. A process for the preparation of a frozen dough for bakery products, which comprises:
   a. fermenting a dough containing 1% or less by weight, based on the flour in said dough, of active yeast to form a punchable fermented dough;
   b. cooling the fermented dough to 2°–15° C. to suppress yeast fermentation activity;
   c. admixing 2–6% by weight, based on the flour in said dough, of additional yeast with the cooled dough; and
   d. freezing the resultant admixture while said additional yeast is in the stage of dormancy or induction.

2. A process according to claim 1, wherein 0.1–1% by weight of active yeast is added in step (a).

3. A process according to claim 1, wherein the dough is fermented in step (a) for less than 3 hours.

4. A process according to claim 1, wherein the additional yeast is added as such, in the form of an aqueous dispersion, or as an admixture with an oil, fat or emulsifier.

5. A process according to claim 1, wherein the dough contains a food additive to inhibit relaxation of the dough and to oxidize reducing substances leaked from the yeast.

6. A process according to claim 5, wherein said additive comprises at least one member selected from the group consisting of potassium bromate and ascorbic acid.

7. A process according to claim 6, wherein said dough contains 5–50 ppm of potassium bromate, ascorbic acid or mixtures thereof.

8. A process according to claim 1, wherein:
   a. the dough is fermented with 0.1–1% by weight active yeast for less than 3 hours; and
   b. the admixture of additional yeast with cooled dough is frozen within 30 minutes.

* * * * *